United States Patent [19]

Federico et al.

[11] Patent Number: 5,408,508
[45] Date of Patent: Apr. 18, 1995

[54] SYSTEM AND METHOD FOR SIMULTANEOUSLY TESTING A PLURALITY OF CONTROL RODS

[75] Inventors: Panfilo A. Federico, Kennedy Township, Allegheny County; James J. Patnesky, Jr., Allison Park, both of Pa.

[73] Assignee: Westinghouse Electric Corporation, Pittsburgh, Pa.

[21] Appl. No.: 168,491

[22] Filed: Dec. 22, 1993

[51] Int. Cl.⁶ .............................................. G21C 17/00
[52] U.S. Cl. ..................................... 376/258; 376/240; 376/259
[58] Field of Search ............... 376/259, 215, 216, 240, 376/245, 258; 976/DIG. 138, DIG. 207; 318/685

[56] References Cited

U.S. PATENT DOCUMENTS

| | | | |
|---|---|---|---|
| 4,073,684 | 2/1978 | Cepkauskas | 376/233 |
| 4,125,432 | 11/1978 | Brookes, Jr. et al. | 376/258 |
| 4,661,310 | 4/1987 | Cook et al. | 376/259 |
| 4,663,576 | 5/1987 | Scarlola et al. | 318/685 |
| 4,696,785 | 9/1987 | Cook et al. | 376/245 |
| 5,006,301 | 4/1991 | Lexa | 376/259 |

Primary Examiner—Donald P. Walsh
Assistant Examiner—Meena Chelliah
Attorney, Agent, or Firm—Peyton C. Watkins

[57] ABSTRACT

A system for simultaneously testing at least two any control rod clusters contained within a reactor vessel, the system comprising a control rod drive mechanism attached to the control rod clusters for retracting the control rod clusters within said reactor vessel to a position suitable for testing. Electrical power means connected to the control rod drive mechanism for supplying electrical power to the control rod drive mechanism and for terminating the power to the control rod drive mechanism and, when terminated, causing said all said control rod clusters to fall into the reactor vessel. A rod position indicator attached to the control rod drive mechanism for monitoring the position of the control rod clusters; and computing means operatively connected to the rod position indicator and receiving a signal representing the fall time of each control rod cluster for generating an elapsed time profile of all the control rod clusters.

9 Claims, 5 Drawing Sheets

SYSTEM AND METHOD FOR SIMULTANEOUSLY TESTING A PLURALITY OF CONTROL RODS

BACKGROUND OF THE INVENTION

1. Field of the Invention

The present invention relates to a system for testing a plurality of control rod clusters positioned in a reactor vessel for any obstructions during insertion and withdrawal of the control rod clusters from a core of the reactor vessel and, more particularly, to a system for simultaneously testing all the plurality of control rod clusters.

2. Background of the Related Art

In nuclear power generation, a reactor vessel is located in a containment building and is the primary vessel wherein heat is generated for producing steam. The reactor vessel includes a flanged body having a flanged, removable upper head bolted atop its upper portion for forming a sealed enclosure. Fuel pellets, which are located within fuel assemblies, are positioned within the reactor vessel for producing a controlled nuclear fission which, in turn, generates the necessary heat. The containment building functions to contain any unlikely radiation leakage from the reactor vessel within the containment building.

To control the nuclear fission process, a plurality of control rods are either selectively inserted or withdrawn from the fuel assemblies. Control rods are typically stainless steel tubes encapsulating an absorber material, and are grouped together in a predetermined number, generally sixteen, forming a control rod cluster. There are typically sixteen control rod clusters in the reactor vessel. The control rod clusters extend into the fuel assemblies when fully inserted, and when the control rod clusters are withdrawn, they extend up and away from the fuel assemblies.

Each control rod cluster is attached to a control rod drive mechanism (CRDM) for axially moving the absorber material within the stainless steel tubes. An electromagnetic coil stack assembly is attached to the CRDM for electromagnetically supplying the CRDM the energy necessary to move the control rod clusters. A switchgear panel is connected to and supplies the electrical power to the coil stack assembly. A rod position indicator (RPI) is attached atop the electromagnetic coil stack assembly and, in cooperation with a RPI data cabinet electrically connected to the RPI, monitors the position of the control rod clusters. It is instructive to note that all of the above components, except the switchgear panel and the RPI data cabinet, are located within the containment building.

Due to safety regulations and the like, before starting-up the plant, each control rod cluster should be tested to ensure they may be inserted into and withdrawn from the fuel assemblies without hitting any obstructions. Present devices for testing the control rod clusters, as are well known in the art, insert them one cluster at a time. In such prior testing arrangements, an oscillograph is manually attached to the RPI data cabinet for receiving a digital signal and providing a trace test signal of the control rod cluster during testing. To start testing, test personnel energize the coil stack assemblies which fully withdraws the control rods, and then de-energize a predetermined coil stack assembly, such as by manipulating a switch in the switchgear panel, for fully inserting a control rod cluster. The oscillograph traces the fall of the preselected control rod cluster into the fuel assemblies on photosensitive paper for visual inspection by the test personnel to determine if any problem exists, as is well known in the art.

Although the present devices are satisfactory, they are not without drawbacks. The present device is time consuming because each control rod cluster is tested separately. In addition, if one wished to simulate an accident condition, all the control rod clusters should be inserted simultaneously. Such accident conditions may not be simulated by the present devices because the clusters may not be tested simultaneously. Further, some of the test personnel are required to be within the containment building during testing to operate the oscillograph, and this requires the test personnel to be temporarily exposed to radiation.

Therefore, a need exists for a system for simultaneously testing a plurality of control rod clusters:

SUMMARY OF THE INVENTION

The present invention provides an improvement designed to satisfy the aforementioned needs. Particularly, the present invention is directed to a system for simultaneously testing at least any two control rod clusters contained within a reactor vessel, the system comprising: a) a control rod drive mechanism attached to the control rod clusters for retracting said control rod clusters from the reactor vessel to a position suitable for testing; b) electrical power means connected to said control rod drive mechanism for supplying electrical power to said control rod drive mechanism and for terminating the power to said control rod drive mechanism and, when terminated, causing all said control rod clusters to fall into the reactor vessel; c) a rod position indicator attached to said control rod drive mechanism for monitoring the position of said control rod clusters; and d) computing means operatively connected to said rod position indicator and receiving a signal representing the fall time of each control rod cluster for generating an elapsed time profile of all said control rod clusters falling into the reactor vessel.

In another broad form, the invention is directed to a method for simultaneously testing at least any two control rod clusters contained within a reactor vessel, comprising the steps of: (a) withdrawing the two control rod clusters to a position suitable for testing; (b) causing the two control rod clusters to simultaneously fall into a core of the reactor vessel; (c) transmitting a signal to a computing means representing the fall time of each tested control rod cluster; and (d) generating an elapsed time profile for each tested control rod cluster by the computing means.

It is an object of the present invention to provide a system for simultaneously testing a plurality of control rod clusters.

It is also an object of the present invention to minimize any exposure to radiation by maintenance personnel during testing.

It is a feature of the present invention to provide a computing means for generating an elapsed time profile of all the plurality of control rod clusters during testing and then displaying all the elapsed time profiles of the plurality of control rods in a graphical form suitable for visual inspection.

It is an advantage of the present invention to provide the display of all the plurality of control rod clusters on a display screen in one millisecond increments.

It is also an advantage to generate dashpot entry time and turnaround time by the computing means.

These and other objects, features, and advantages will become apparent to those skilled in the art upon a reading of the following detailed description when taken in conjunction with the drawings wherein there is shown and described illustrative embodiments of the invention.

DESCRIPTION OF THE DRAWINGS

While this specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENT(S)

Figure 1:
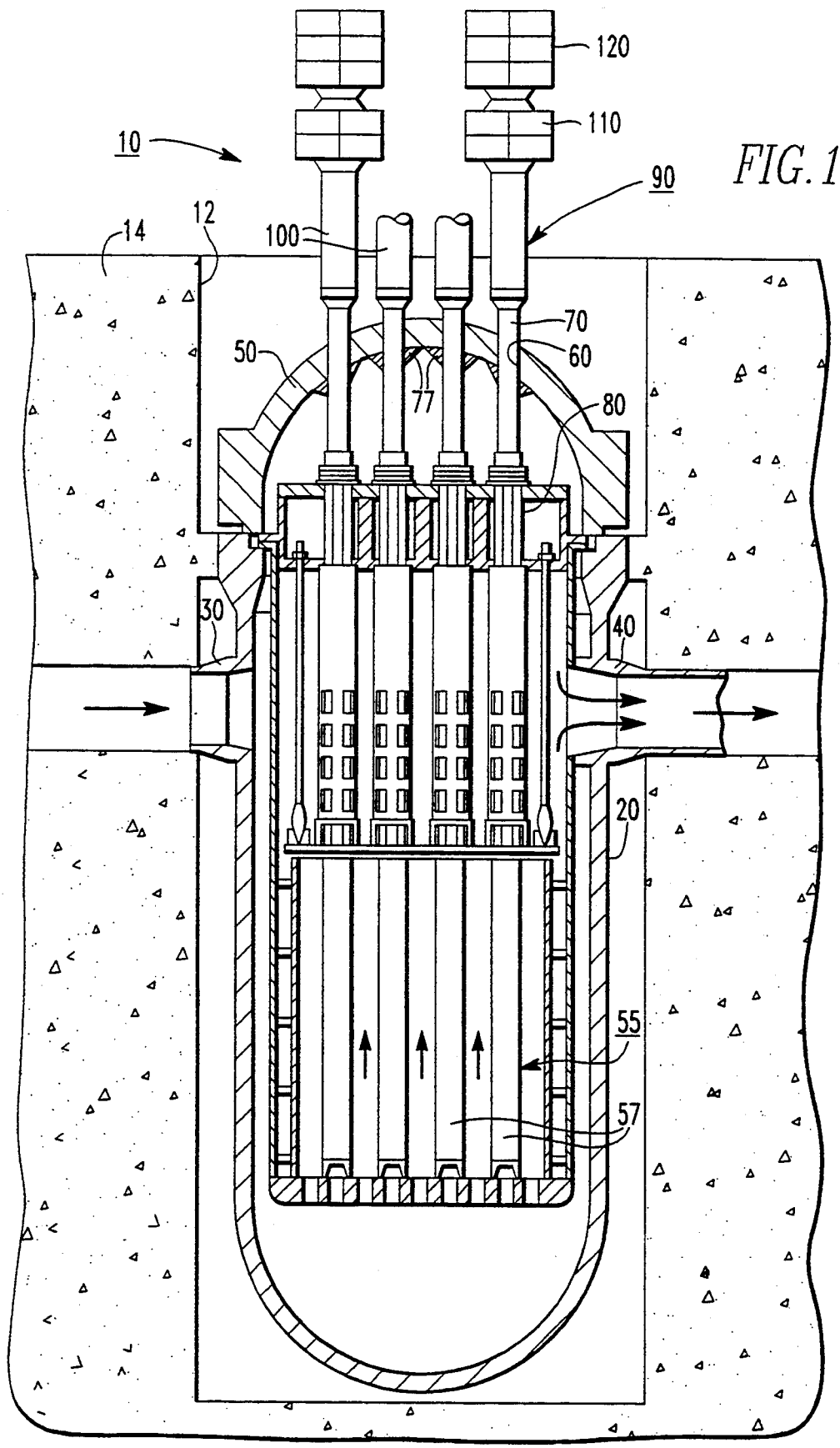
FIG. 1 is a view in vertical cross section of a reactor vessel.

Referring now to the drawings, and particularly to FIG. 1, there is shown a typical nuclear power reactor vessel, generally referred to as 10, for producing heat by a controlled fission of a fissionable material (not shown). The reactor vessel 10 is disposed in a reactor cavity 12 defined by a containment building 14. The reactor vessel 10 includes a cylindrical shaped bottom 20 open at its top end and having a plurality of inlet nozzles 30 and outlet nozzles 40 attached to the upper portion thereof (only one of each nozzle is shown). A flanged, hemispherical shaped reactor vessel closure head 50, which may be carbon steel, is mounted atop the bottom 20 and is sealingly attached to the open top end of the bottom 20 so that the closure head 50 sealingly caps the bottom 20. Capping the bottom 20 in this manner allows for suitable pressurization of the coolant (not shown) circulating through the bottom 20 as the reactor vessel 10 operates. The coolant may be borated demineralized water maintained at a relatively high pressure of approximately 2500 psia and a temperature of approximately 650 degrees Fahrenheit.

A reactor core 55 is disposed in the interior of the reactor vessel 10. The reactor core 55 comprises a plurality of nuclear fuel assemblies 57 containing the fissionable material. The fuel assemblies 57 include a plurality of vertically extending fuel rods (not shown) structurally bound together. A plurality of vertically extending thimble tubes (not shown) are selectively positioned within each fuel assembly 57 for receiving a control rod which functions to control the fissionable process. The thimble tubes are structurally bound together by a spider assembly forming a movable control rod cluster (not shown in FIG. 1).

A plurality of closure head openings 60 are formed through the top of closure head 50 for respectively receiving a plurality of generally tubular shaped control rod drive mechanism (CRDM) penetration tubes 70. Each penetration tube 70 is affixed to the closure head 50 by weldments 77. Each CRDM penetration tube 70 houses a control rod drive shaft (not shown) extending therethrough; the drive shaft engaging at least one movable control rod cluster.

A control rod drive mechanism (CRDM) 90 is connected to the penetration tube 70 for axially moving a drive rod 80 and thus the control rod cluster connected thereto. The CRDM comprises a generally tubular pressure housing 100, which may be type 304 stainless steel. An electromagnetic coil stack assembly 110 is attached to the pressure housing 100 for electromagnetically and axially moving the drive rod 80 as the coil stack assembly 110 is electrically energized. When the coil stack assemblies 110 are energized, the control rods are fully withdrawn from the core 55. When the coil stack assemblies 110 are deenergized, the control rods are fully inserted into the core 55. A rod position indicator (RPI) 120 is attached to the coil stack assembly 110 for monitoring the position of the control rods, as is well known in the art.

As the reactor vessel 10 operates, the coolant enters the bottom 20 and circulates therethrough generally in the direction of the arrows. As the coolant circulates through the bottom 20, it also circulates over the fuel assemblies 57 for assisting in the fission process and for removing the heat produced by fission of the fissionable material contained in the fuel assemblies 57. The coil stack assemblies 110 axially move the control rod clusters in and out of fuel assemblies 57 to suitably control the fission process therein. The heat generated by the fuel assemblies 57 is ultimately transferred to a turbine-generator set for producing electricity in a manner well known in the art.

Figure 2:
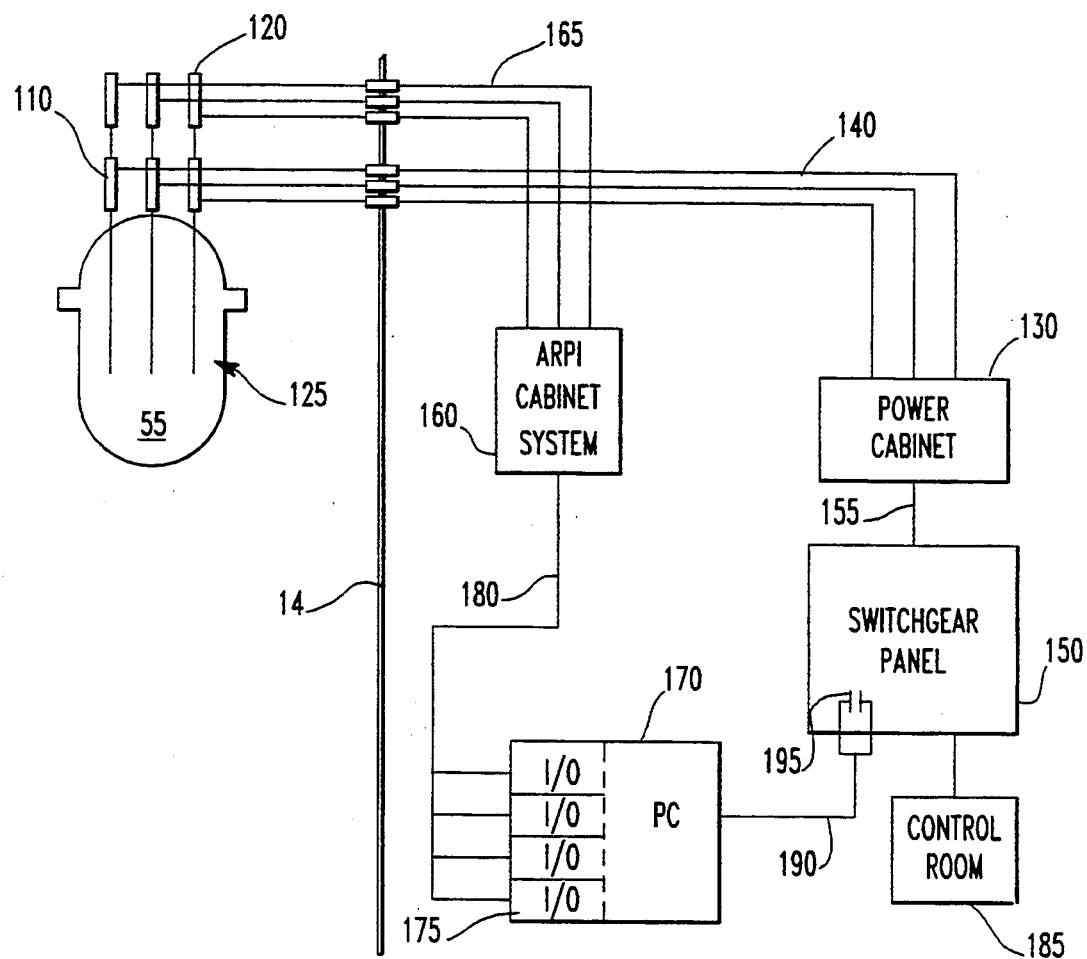
FIG. 2 is a schematic drawing of an analog rod position indication system test arrangement of the present invention.

Referring to FIG. 2, there is illustrated a system for testing the control rod clusters 125 in an analog rod position indication system. The coil stack assemblies 110 which drive the control rod clusters 125 are each connected to a power cabinet 130 via cables 140. The power cabinet 130 is located outside the containment building 14 and is the control device which selectively energizes predetermined coil stack assemblies 110 which, in turn, causes the associated control rod cluster to either be withdrawn or inserted into the reactor core 55. A switchgear panel 150 is connected via a bus 155 to the power cabinet 130 and contains a breaker (not shown) which interrupts the electrical power to the coil stack assemblies 110. The switch-gear panel 150 is connected to a power source (not shown) and supplies power to the power cabinet 130 and, eventually, the coil stack assemblies 110 when required. The electrical power to the coil stack assemblies 110 is typically energized or de-energized by respectively closing or opening the breaker by an operator, who may physically manipulate the breaker or remotely manipulate the breaker from a control room 175 as is well known in the art.

To monitor the position of the control rod clusters 125, the RPI 120 is connected via signal cables 165 to an analog rod position indication system 160 (ARPI system) which functions with the RPI 120 for monitoring the position of the control rod clusters 125, as is well known in the art.

Typical plant specifications require that all control rod clusters 125 be tested by fully withdrawing all the control rod clusters and then fully inserting them, by gravity, into the reactor vessel 55 prior to returning to power after a nuclear plant refueling. This requirement ensures that the refueling process has not affected their freedom of movement.

To test the control rod clusters 125, a personal computer (PC) 170 is connected to both the ARPI system 160, via cables 180, and to the switchgear panel 150, via a cable 190. The PC 170 provides the operator interface and displays the results of the test on a display screen (not shown). The PC 170 contains input/output cards 175 for receiving signals from the ARPI system 160 and for performing functions such as filtering, analog to digital conversion, and memory storage of signals sent by the ARPI system 160. The memory storage of the PC 170 includes dedicated memory for each control rod cluster 125; the dedicated memory stores the entire drop time of each control rod cluster 125, typically less than 4 seconds. The input/output cards 175 are those such as model number PR-ADC1 which are commercially available from Elexor Associates, Inc. in Morris Plains, N.J. The PC 170 is attached to an electrical (normally closed) contact 195, although a normally open contact could also be used, which changes state (to the open position) when the reactor trip breaker inside the switchgear panel 150 is tripped or opened.

To start the test, the coil stack assemblies 110 are sequentially energized in a predetermined fashion by the plant operator as previously described, which causes all the control rod clusters 125 to be fully withdrawn. Although all the control rod clusters 125 are tested in this embodiment, the present invention can test one or any combination of the control rod clusters 125 by selectively energizing the predetermined control rod cluster or clusters 125. The reactor trip breaker is then tripped by the operator located in control room 185 which, in turn, causes all the control rod clusters 125 to fall by gravity into the core 55. Simultaneously with the breaker tripping, the contact 195 opens which signals the PC 170 to start data collection. The ARPI system 160 transmits an analog signal representing the drop time of each control rod cluster over the cables 180 to the input/output cards 175 which condition and digitize the received signal. The PC 170 then generates the elapsed time profile of all the control rods 125 falling from the fully withdrawn position to the bottom of the core 55, hereinafter referred to as the elapsed time profile. Each control rod cluster profile may then be individually displayed on the screen for visual inspection.

Figure 3:
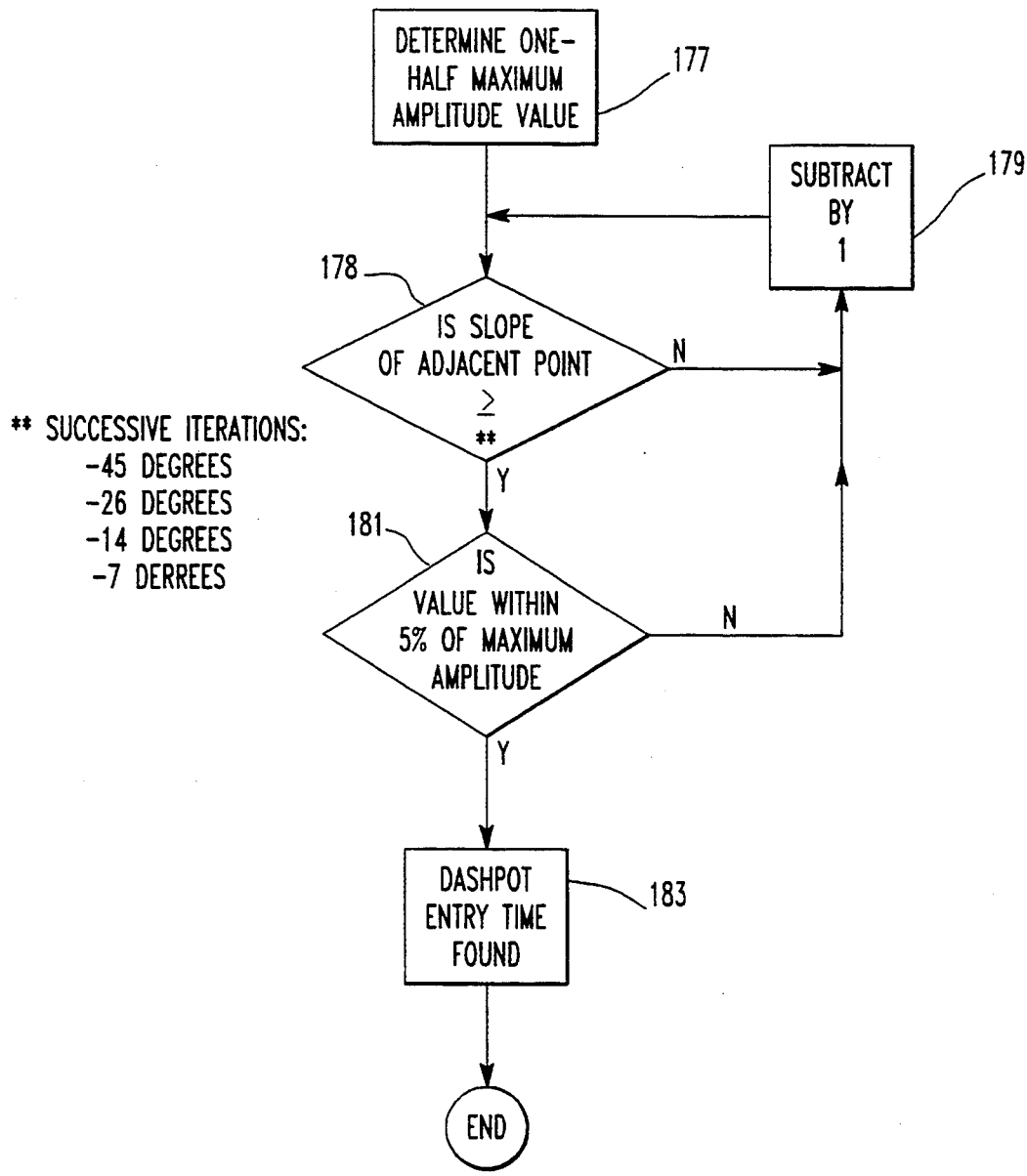
FIG. 3 is a flowchart of a computer program used in the present invention.
Figure 4:
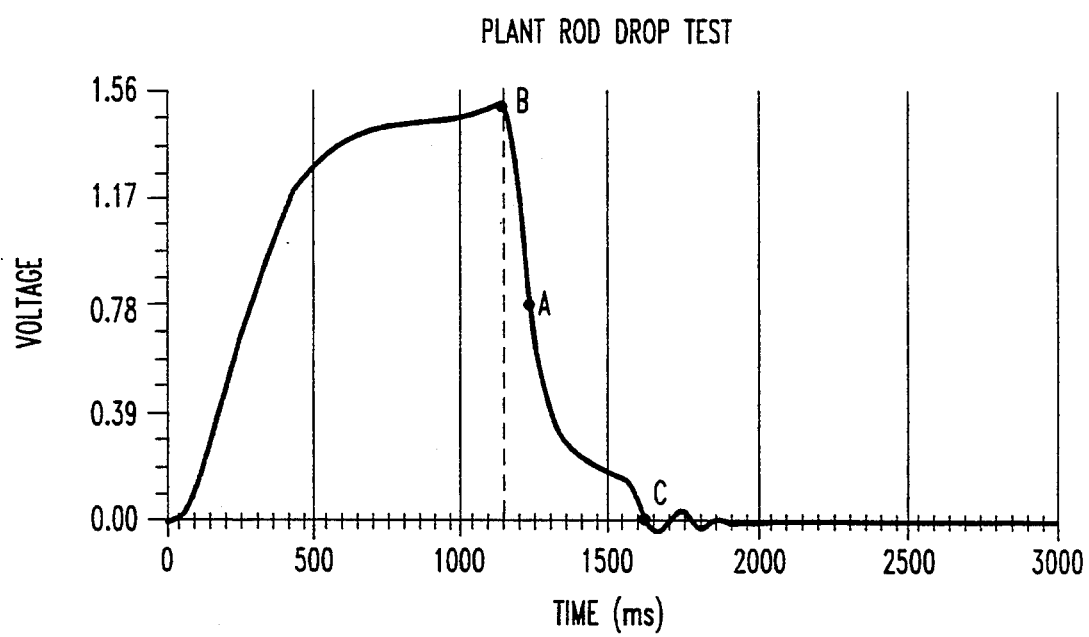
FIG. 4 is a simulated graph of an elapsed time profile of a tested control rod cluster using the present invention.

It is instructive to understand that the elapsed time profile is typically divided into two parts for analysis by test personnel for problems with the control rod clusters. This two part analysis is well known in the art, but was previously accomplished by visual approximations of a visicorder graph. The first part is a dashpot entry time which is the time between a control rod falling from the fully withdrawn position to time of entry of the control rod into the coolant. The second part is a turn-around time which is the time between the initial dropping of the control rod to the time the control rod hits the bottom of the core 55 (i.e., total drop time). The PC 170 includes software, which is obtainable from Westinghouse Electric Corp. in O'Hara Township, PA, that generates both the dashpot entry time and turn-around time. A flowchart of the software is shown in FIG. 3, which is better understood when taken in conjunction with the graph it generates, FIG. 4. The abscissa of FIG. 4 is the time it takes for a control rod cluster to fall into the core, and the ordinate of FIG. 4 is the voltage taken from ARPI system 160. The elapsed time profile is displayed in one millisecond intervals for enabling operators to better determine the cause of obstructions, if any.

To calculate the dashpot entry time, the PC 170 starts at one half of the maximum amplitude value (A) of the profile (block 177) and scans the generated plot, going in a direction towards a maximum amplitude value (B) by looking at each adjacent point, for a first slope of negative 45 degrees, blocks 178 and 179. If that point is within 5 percent of the maximum amplitude value, block 181, the dashpot entry time is determined from the ordinate at this point, block 183. If it is not within 5 percent, the program continues to scan the generated plot from that point, going in a direction along the generated plot towards the maximum amplitude value (B) by looking at each adjacent point, for a slope of negative 26 degrees, blocks 178 and 179. If it is within 5 percent, block 181, the dashpot entry time is determined from the ordinate at this point, block 183. If it is not within 5 percent, the program then repeats this same process for the negative 14 degree point, blocks 178 and 179, and negative 7 degree point, blocks 178 and 179, so as to reach a point within 5 percent of the maximum value point. On each reiteration, the program checks for its next predetermined slope between the previous checked slope and the maximum amplitude value (B). After the dashpot entry time is determined, the turn-around time is determined by taking the time between the dashpot entry time, as determined above, and the time the control rods hit the bottom of the core, which is represented by the point where the graph crosses the ordinate (C).

Figure 5:
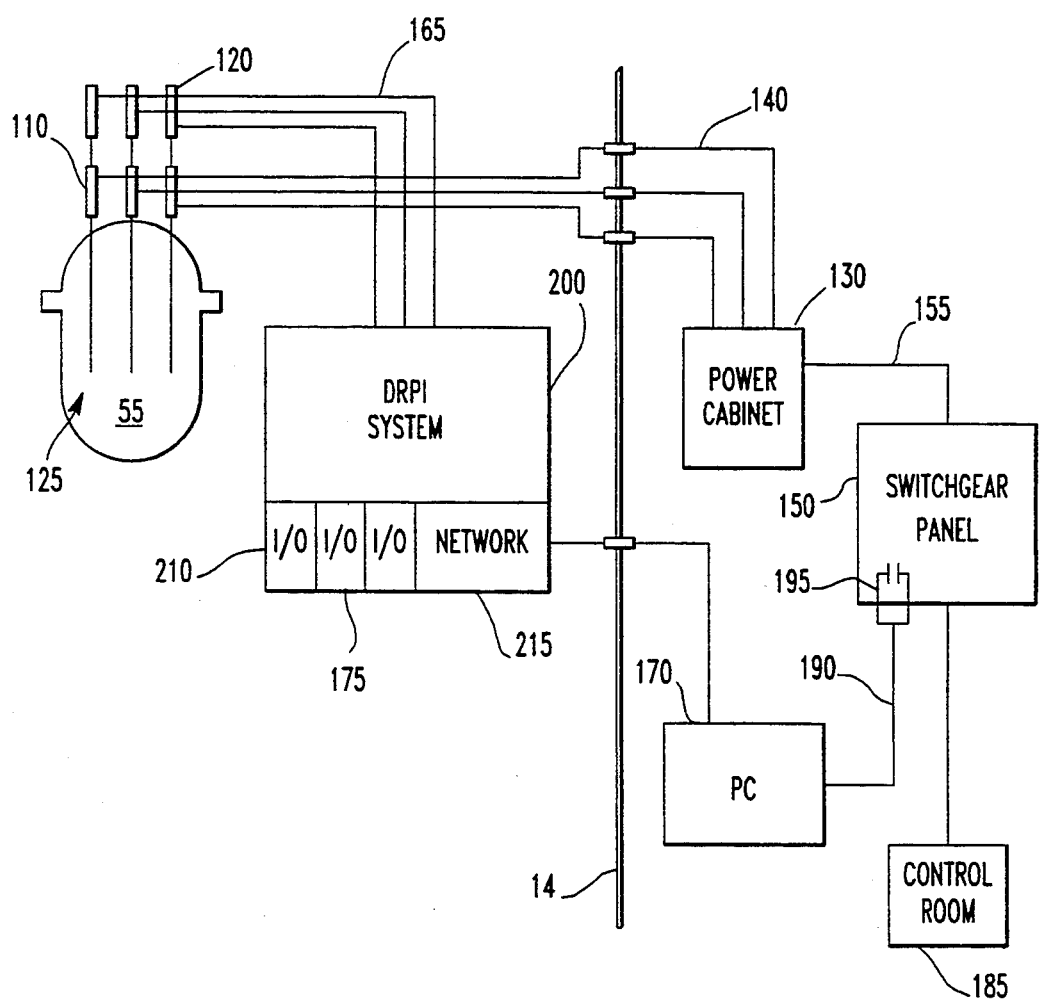
FIG. 5 is a schematic drawing of a digital rod position indication system test arrangement of the present invention.

Referring to FIG. 5, to test the control rod clusters 125 in a digital rod position indicator system, additional components are added to the system. A conditioning chassis 210 is added to a digital rod position indication system 200 (DRPI system) and is connected internally to the appropriate control rod data collection points within the DRPI system 200. The signal conditioning chassis 210 includes the input/output cards 175 which perform filtering, analog to digital conversion and memory storage for the DRPI system 200 signals. The input/output cards 175 are the same input/output cards 175 as used in the analog system. The signal conditioning chassis 210 also includes a network card 215 to allow the input/output cards 175 and the PC 170, located remotely outside of the reactor containment building 14, to communicate with each other as is well known in the art.

To test the control rod clusters 125, the system is initiated as stated above and repeated here for clarity. The coil stack assemblies 120 are sequentially energized by the plant operator which causes all the control rod clusters 125 to be fully withdrawn. The reactor trip breaker is then tripped by the operator located in control room 185, which causes all the control rod clusters 125 to fall, by gravity, into the core 55. Simultaneously with the breaker tripping, the contact 195 opens which signals the signal conditioning chassis 210 to start data collection. The elapsed time profile for each control rod cluster 125 is stored in memory on the input/output cards 175. At the completion of the control rod cluster 125 drops, the signal conditioning chassis 210 transmits the digitized data to the PC 170 where they are displayed one cluster at a time on the PC 170 screen. The elapsed time profile is printed and the data is written to the hard disk drive of the PC 170 as a file.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described merely a preferred or exemplary embodiment thereof.

We claim:

1. A system for simultaneously testing at least any two control rod clusters contained within a reactor vessel, the system comprising:
    a) a control rod drive mechanism attached to said control rod clusters for retracting said control rod clusters from within the reactor vessel to a position suitable for testing;
    b) electrical power means connected to said control rod drive mechanism for supplying electrical power to said control rod drive mechanism and for terminating the power to said control rod drive mechanism and, when terminated, causing all said control rod clusters to fall into the reactor vessel;
    c) a rod position indicator attached to said control rod drive mechanism for monitoring the position of said control rod clusters; and
    d) computing means operatively connected to said rod position indicator and receiving a signal representing a fall time of each control rod cluster for substantially simultaneously generating an elapsed time profile of all said control rod clusters falling into the reactor vessel.

2. The system as in claim 1, wherein said computing means includes means for determining a dashpot entry time and a turnaround time.

3. The system as in claim 2, wherein said computing means includes means for displaying the elapsed time profile of a control rod cluster in increments of one millisecond.

4. The system as in claim 3, wherein said computing means includes means for storing each control rod profile.

5. The system as in claim 4, wherein said computing means includes means for converting an analog signal to a digital signal.

6. The system as in claim 5, wherein said computing means is located outside a containment building for minimizing exposure to any radiation.

7. A method for simultaneously testing at least any two control rod clusters contained within a reactor vessel, comprising the steps of:
    (a) withdrawing at least the two control rod clusters to a position suitable for testing;
    (b) causing at least the two control rod clusters to simultaneously fall into the reactor vessel;
    (c) transmitting a signal to a computing means representing a fall time of each tested control rod cluster; and
    (d) substantially simultaneously generating an elapsed time profile for each control rod cluster by the computing means.

8. The method as in claim 7 further comprising the step of computing a dashpot entry time and a turnaround time by the computing means.

9. The method as in claim 8 further comprising the step of displaying the elapsed time profile of each control rod cluster in one millisecond increments for analysis of any problems.

* * * * *

REEXAMINATION CERTIFICATE (3163rd)

United States Patent [19]
Federico et al.

[11] B1 5,408,508
[45] Certificate Issued Mar. 25, 1997

[54] SYSTEM AND METHOD FOR SIMULTANEOUSLY TESTING A PLURALITY OF CONTROL RODS

[75] Inventors: Panfilo A. Federico, Kennedy Township, Allegheny County; James J. Patnesky, Jr., Allison Park, both of Pa.

[73] Assignee: Westinghouse Electric Corporation, Pittsburgh, Pa.

Reexamination Request:
No. 90/004,121, Dec. 11, 1995

Reexamination Certificate for:
Patent No.: 5,408,508
Issued: Apr. 18, 1995
Appl. No.: 168,491
Filed: Dec. 22, 1993

[51] Int. Cl.$^6$ ................................................. G21C 17/00
[52] U.S. Cl. ........................... 376/258; 376/240; 376/259
[58] Field of Search ................................... 376/258, 240, 376/259

[56] References Cited

U.S. PATENT DOCUMENTS 5,006,301  4/1991  Lexa ........................................ 376/258

OTHER PUBLICATIONS

NRC Information Notice 88–47, "Slower–Than–Expected Rod–Drop Times", Jul. 14, 1988.
NRC Licensee Event Report 88–009–00, "Control Element Assembly Drop Time Exceeded That Allowed By Technical Specifications And Assumed By Safety Analyses Due To Incorrect Testing Method", Jun. 6, 1988, NRC Docket 05000368.
Arkansas Power & Light Company, May 5, 1988 Letter to NRC; NRC Docket 05000368.
NRC May 6, 1988 Letter to Arkansas Power & Light Company; NRC Docket 05000368.
Arkansas Power & Light Company, May 9, 1988 Letter to NRC, NRC Docket 05000868.
Undated Westinghouse Electric Corporation Sales Brochure entitled "Sensor Response and Drop time Test System".

*Primary Examiner*—Daniel D. Wasil

[57] ABSTRACT

A system for simultaneously testing at least two any control rod clusters contained within a reactor vessel, the system comprising a control rod drive mechanism attached to the control rod clusters for retracting the control rod clusters within said reactor vessel to a position suitable for testing. Electrical power means connected to the control rod drive mechanism for supplying electrical power to the control rod drive mechanism and for terminating the power to the control rod drive mechanism and, when terminated, causing said all said control rod clusters to fall into the reactor vessel. A rod position indicator attached to the control rod drive mechanism for monitoring the position of the control rod clusters; and computing means operatively connected to the rod position indicator and receiving a signal representing the fall time of each control rod cluster for generating an elapsed time profile of all the control rod clusters.

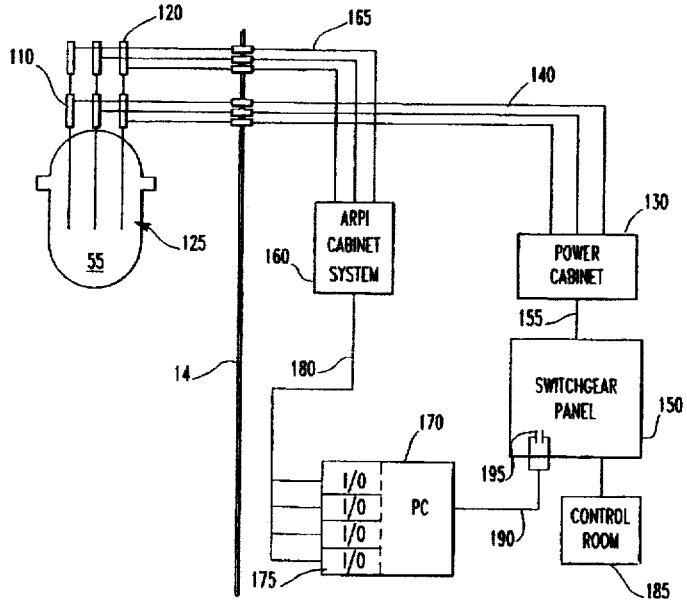

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7 are determined to be patentable as amended.

Claims 2–6 and 8–9, dependent on an amended claim, are determined to be patentable.

1. A system for simultaneously testing at least any two control rod clusters contained within a reactor vessel, the system comprising:
   a) a control rod drive mechanism *magnetically coupled with drive rods* attached to said control rod clusters for retracting said control rod clusters from within the reactor vessel to a position suitable for testing;
   b) electrical power means connected to said control rod drive mechanism for supplying electrical power to said control rod drive mechanism and for terminating the power to said control rod drive mechanism and, when terminated, *magnetically decoupling all said drive rods and thereby* causing all said control rod clusters to fall into the reactor vessel *by gravity*;
   c) a rod position indicator attached to said control rod drive mechanism for monitoring the position of said control rod clusters; and
   d) computing means operatively [connected to] *networked with* said rod position indicator and receiving a signal representing a fall time of each control rod cluster for substantially simultaneously generating an elapsed time profile of all said control rod clusters falling into the reactor vessel *and then displaying or printing said elapsed time profiles*.

7. A method for simultaneously testing at least any two control rod clusters contained within a reactor vessel, comprising the steps of:
   (a) withdrawing at least the two control rod clusters to a position suitable for testing;
   (b) *electromagnetically* causing at least the two control rod clusters to simultaneously fall into the reactor vessel *by gravity*;
   (c) transmitting a signal *from a rod position indicator system monitoring the fall of the control rod clusters* to a computing means *networked therewith* representing a fall time of each tested control rod cluster; [and]
   (d) substantially simultaneously generating an elapsed time profile for each control rod cluster by the *networked* computing means *and then*
   (e) *displaying or printing the elapsed time profiles*.

* * * * *